US012306860B1

(12) United States Patent
Garg

(10) Patent No.: US 12,306,860 B1
(45) Date of Patent: May 20, 2025

(54) INTELLIGENTLY EXPANDING SEARCH RESULTS AHEAD-OF-TIME

(71) Applicant: Oracle International Corporation, Redwood Shores, CA (US)

(72) Inventor: Anurag Garg, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/761,483

(22) Filed: Jul. 2, 2024

(51) Int. Cl.
G06F 16/30 (2019.01)
G06F 16/338 (2019.01)
G06F 16/36 (2019.01)

(52) U.S. Cl.
CPC .......... *G06F 16/338* (2019.01); *G06F 16/374* (2019.01)

(58) Field of Classification Search
CPC ............................. G06F 16/338; G06F 16/374
See application file for complete search history.

(56) References Cited

U.S. PATENT DOCUMENTS

| | | | | |
|---|---|---|---|---|
| 11,734,507 B1 * | 8/2023 | Scott | ...................... | G06F 40/284 715/208 |
| 2005/0065774 A1 * | 3/2005 | Doganata | ................. | G06F 16/31 704/7 |
| 2009/0006359 A1 * | 1/2009 | Liao | ....................... | G06F 16/374 707/999.005 |
| 2010/0198821 A1 * | 8/2010 | Loritz | ............... | G06F 16/90332 707/765 |
| 2018/0081874 A1 * | 3/2018 | Zelenkov | .............. | G06F 40/284 |

FOREIGN PATENT DOCUMENTS

JP  2000222410 A  *  8/2000

OTHER PUBLICATIONS

YouTube Video entitled "GPT Synonyms—The intelligence of Large Language Models just a click away", by FactFinder, uploaded on Aug. 23, 2023 (Year: 2023).*
Article entitled "Synonym Finder", by Lunabot, dated May 30, 2024 (Year: 2024).*
Article entitled "FactFinder unveils GPT Synonyms—the intelligence of Large Language Models just a click away", by McConville, dated Sep. 28, 2023 (Year: 2023).*
Article entitled "Using GPT-3 to Build a Lexicon of Drugs of Abuse Synonyms for Social Media Pharmacovigilance", by Carpenter et al., dated Feb. 18, 2023 (Year: 2023).*

* cited by examiner

*Primary Examiner* — Mahesh H Dwivedi
(74) *Attorney, Agent, or Firm* — MUGHAL GAUDRY & FRANKLIN PC

(57) ABSTRACT

A data management system determines that an updated thesaurus entry does not exist for a value of a record. The data management system generates a prompt to discover a set of synonyms and/or acronyms for the value by substituting a placeholder in a thesaurus prompt template with the value. The thesaurus prompt template includes a request that specifies an output format. A large language model is prompted with the prompt to generate a set of resulting values. The data management system causes display of the value, resulting value(s) that have not been approved, and an option to mark any of the resulting value(s) as approved. Based at least in part on receiving a selection of the option that marks at least one resulting value as approved, the data management system modifies a thesaurus entry for the value to indicate approval. The thesaurus entry is used to locate the record in response to a query.

20 Claims, 7 Drawing Sheets

INTELLIGENTLY EXPANDING SEARCH RESULTS AHEAD-OF-TIME

BACKGROUND

Data management systems store data for analysis by users. The data is stored in records or objects that include data values. Data values may be stored in different fields or columns of a record, indicating a context for how the data values apply to the record. The data values may include flat values that store textual, audio, or visual data in the record and can be set or changed by a user or application. The record may also include relational values that store references to other records. The references identify records of other types or of the same type using keys or unique values. Some records may include dynamic values that are defined based on a deterministic or formulaic combination of other values in other records.

Data management systems allow users to search for values in the records. The searches may cover the wide range of data values available and provide users with the ability to drill into a resulting record containing searched values or navigate to other records related to the resulting record.

If the user does not know how the data is stored or what data to search for, the user may not find any records at all, may not find any records relevant to the user's intended purpose, may find the wrong record and mistakenly assume the wrong record is relevant, or may consume more time and computing resources in finding a relevant record. If the user assumes a relevant record does not exist, the user may create another record that co-exists with the unknown relevant record. These co-existing records may be updated by different users at different times, resulting in data divergence. As a result, data management systems may not be able to accurately keep track of data values or provide accurate analyses of those data values.

BRIEF SUMMARY

In some embodiments, a data management system determines that an updated thesaurus entry does not exist for a value of a record. The data management system generates a prompt to discover a set of synonyms and/or acronyms for the value by substituting a placeholder in a thesaurus prompt template with the value. The thesaurus prompt template includes a request that specifies an output format. A large language model is prompted with the prompt to generate a set of resulting values. The data management system causes display of the value, resulting value(s) that have not been approved, and an option to mark any of the resulting value(s) as approved. Based at least in part on receiving a selection of the option that marks at least one resulting value as approved, the data management system modifies a thesaurus entry for the value to indicate approval. The thesaurus entry is used to locate the record in response to a query.

In one embodiment, a computer-implemented method includes accessing a record comprising a plurality of values. The plurality of values includes a particular value. The computer-implemented method includes determining whether an updated thesaurus entry exists for the particular value. Based at least in part on determining that the updated thesaurus entry does not exist for the particular value, the computer-implemented method generates a prompt to discover a set of synonyms and acronyms for the particular value at least in part by substituting a placeholder in a thesaurus prompt template with the particular value. The thesaurus prompt template comprises a request for any synonyms and acronyms for the placeholder, and the thesaurus prompt template specifies an output format. The computer-implemented method includes prompting a large language model with the prompt to generate a set of resulting values in the output format. The computer-implemented method stores, as at least part of the updated thesaurus entry for the particular value, the set of resulting values, a current date, and an indication that one or more resulting values of the set of resulting values have not been approved. The computer-implemented method includes causing display of the particular value, the one or more resulting values, and an option to mark any of the one or more resulting values as approved. The computer-implemented method receives a selection of the option that marks at least one resulting value of the one or more resulting values as approved. Based at least in part on the selection, the computer-implemented method modifies the updated thesaurus entry to indicate that the at least one resulting value is approved. The updated thesaurus entry is used to locate the record in response to a query comprising the at least one resulting value. The step of storing the record did not store the at least one resulting value as part of the record.

In a further embodiment, determining whether the updated thesaurus entry exists for the particular value comprises determining whether an existing thesaurus entry for the particular value has been updated within a threshold amount of time. In this embodiment, determining that the updated thesaurus entry does not exist for the particular value comprises determining that the existing thesaurus entry has not been updated within the threshold amount of time.

In another further embodiment, determining whether the updated thesaurus entry exists for the particular value comprises determining whether any thesaurus entry exists for the particular value. In this embodiment, determining that the updated thesaurus entry does not exist for the particular value comprises determining that no thesaurus entry exists for the particular value.

In the same or a different further embodiment, the plurality of values are selected for the record based at least in part on how frequently the plurality of values have occurred in user queries. In this embodiment, the steps of determining, generating, prompting, and storing are performed for each value of the plurality of values.

In another embodiment, the plurality of values are in a plurality of columns of a record. In this embodiment, the particular value is in a particular column that is marked for synonym expansion. The computer-implemented method further includes newly storing the particular value in the particular column. In this embodiment, the steps of determining, generating, prompting, and storing are performed in response to newly storing the particular value in the particular column.

In the same or another embodiment, based at least in part on a characteristic associated with the particular value, the computer-implemented method selects one or more examples. Each example of the one or more examples comprising another particular value and another set of resulting values. In this embodiment, generating the prompt comprises including, in the prompt, the one or more examples in the output format.

In the same or another embodiment, generating the prompt comprises including, in the prompt, a request for a score of each resulting value of the set of resulting values. The computer-implemented method further includes storing, in the updated thesaurus entry for the particular value, a set of scores corresponding to the set of resulting values. In this embodiment, causing display of the particular value, the one or more resulting values, and the option further comprises causing display of one or more scores corresponding to the one or more resulting values.

In the same or another embodiment, the computer-implemented method further includes storing, in the updated thesaurus entry for the particular value, a set of scores corresponding to the set of resulting values. Based at least in part on the set of scores, the computer-implemented method generates, for each resulting value of the set of resulting values, a recommendation of whether to approve or reject the resulting value. In this embodiment, causing display of the particular value, the one or more resulting values, and the option further comprises causing display of one or more recommendations of whether to approve or reject the one or more resulting values.

In the same or another embodiment, the computer-implemented method further includes receiving another selection of another option that marks at least one other resulting value of the one or more resulting values as rejected. Based at least in part on the other selection, the computer-implemented method modifies the updated thesaurus entry to indicate that the at least one other resulting value is rejected. In this embodiment, the using the updated thesaurus entry does not use the at least one other resulting value to locate the record.

In the same or another embodiment, the computer-implemented method further includes analyzing the set of resulting values to determine one or more other resulting values that are excluded from review based on one or more criteria. In this embodiment, the causing display of the particular value, the one or more resulting values, and the option does not include an option to approve the one or more other resulting values.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
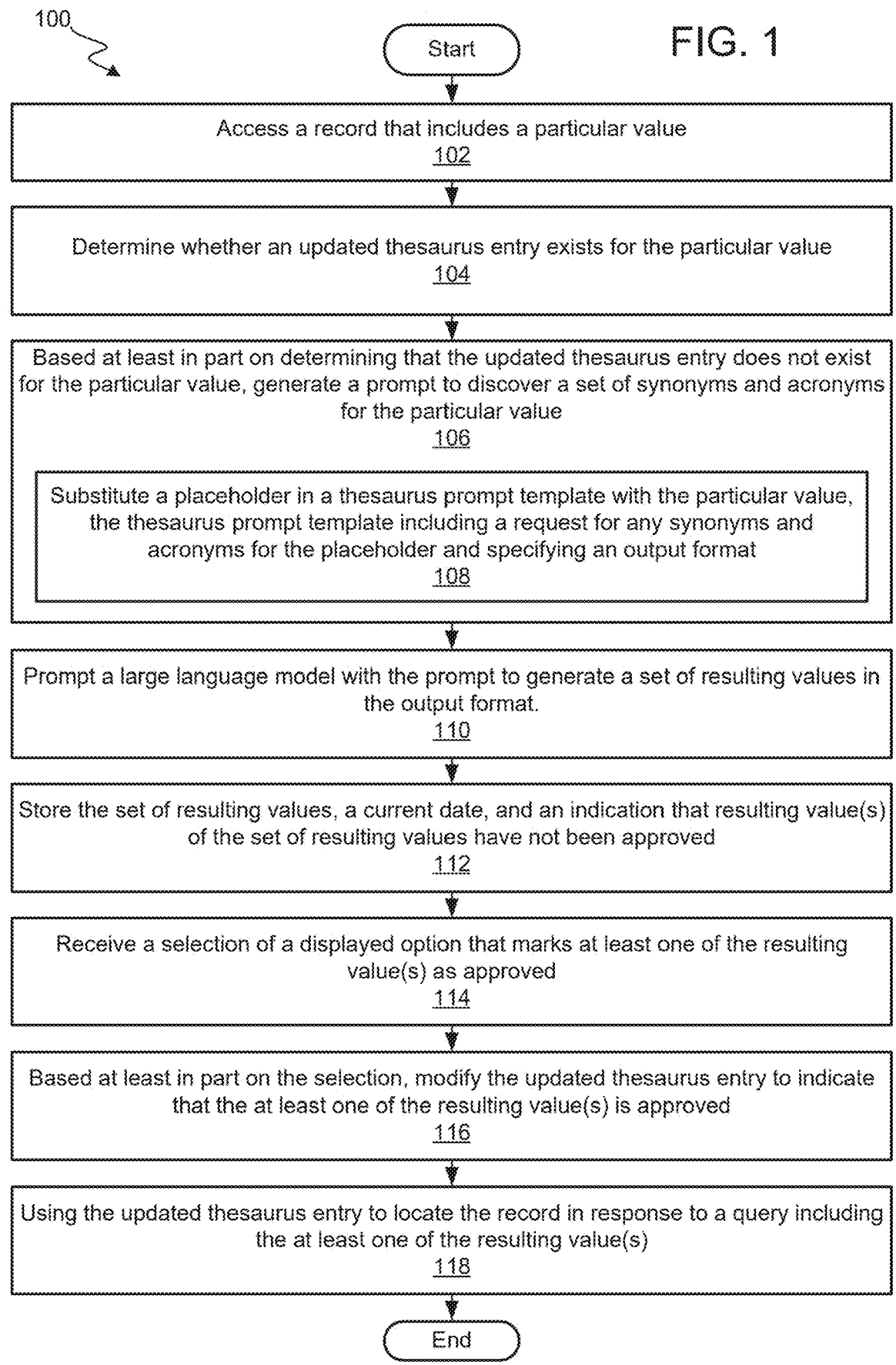
FIG. 1 illustrates a flow chart of an example process that intelligently expands search results ahead-of-time.

A data management system updates thesaurus entries for use in locating records in response to queries. The data management system determines that an updated thesaurus entry does not exist for a value of a record. The data management system prompts a large language model to discover a set of resulting values that include synonyms and/or acronyms for the value. The data management system causes display of an option to mark any of the resulting value(s) as approved. Based at least in part on receiving a selection of the option that marks at least one resulting value as approved, the data management system modifies a thesaurus entry for the value to indicate approval. The data management system may be implemented on a local or cloud-based computer system that includes processors and is communicatively coupled to display(s) for showing user interface(s) to user(s) for performing searches, viewing results, confirming thesaurus entries, and/or modifying thesaurus entries. The computer system may communicate with client computer systems, such as systems including client browsers, for displaying the user interfaces.

A description of data management system that maintains thesaurus entries is provided in the following sections:
DATA MANAGEMENT
SYNONYM-ENABLED SEARCH
AUTOMATIC EXPLORATION OF SEARCH TERMS
PROMPT STRUCTURE
EXPANSION OF SEARCH TERMS TO ENTITY-RELATED TERMS
AUTOMATIC SCORING, RANKING, AND FILTERING SEARCH TERMS.
AUTOMATIC EXPANSION OF SEARCH TERMS
AUTOMATIC SCREENING OF EXPANDED SEARCH TERMS
ASYNCHRONOUS REVIEW OF EXPANDED SEARCH TERMS
SYNCHRONOUS FEEDBACK AND CUSTOMIZATION OF EXPANDED SEARCH TERMS
COMPUTER SYSTEM ARCHITECTURE The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Data Management

Data is stored in data structures such as tables or other objects in a database. Each item or record of data may include flat fields that store values describing characteristics of the record of data and/or relational fields that hold references to other records of data. As used herein, the terms "field" and "column" are used interchangeably. A column or field of a record is a logical container in the record for holding a value or a reference to another record. In one example, a record may include a name field to store a name value of the record, description field(s) to store description value(s) of the field, and one or more key value fields to store references to key values of other records. A dimension is an object holding records that reference other records using key values of other records or that are referenced by other records using a key value that uniquely identifies the records in the dimension.

For example, an office record in an office dimension may include a key value field that references a location record for a region of office locations. In the example, the location record may include additional flat fields and/or relational fields to reference other records. For example, the location record may store a list of offices in the region by listing references using key values that refer back to records of the office object corresponding to the different offices in the region.

The data may relate to other stored data or be associated with other stored data in a hierarchy, and each data record or node may store information about a particular entity or item described by a particular position in the hierarchy. The data records may be stored across multiple dimensions of data that include records corresponding to each dimension that may be updated or maintained separately, with some dimensions referencing other dimensions to provide added context to the dataset. For example, a location dimension may provide more detailed information about particular locations, and the location dimension may be referenced by an entity in an entity dimension, for example referencing a location of the entity. The location dimension may include roll-up data structures that explain the location at higher levels such as region or country or at lower levels such as state or city, or even lower levels such as address or pertaining to flat field characteristics associated with the address (e.g., parking characteristics, access codes, indoor space description(s), outdoor space description(s), service(s) offered at the address, employee(s) working at the address, etc.).

Searching for multidimensional data is complex, as the target of a search might not all appear in a single record. Instead, data values may occur in different dimensions at different levels of roll-ups in the different dimensions, and the precise levels of roll-ups may not be referenced record-to-record. For example, I may be searching for a shoe vendor in the United States. On a shoe vendor's record, the address may be provided as Redwood City, California, and the address may be linked to the location dimension using a key value that identifies Redwood City as the location. The record might not include the words "United States" anywhere in the record. A data management system may search for data not only in a single record but in records that are connected across multiple dimensions, records that are connected via roll-ups in the same dimension, and/or records that are connected via roll-ups to records that are connected across multiple dimensions. In this example, the data management system may find a dimension value "United States" and determine all records that may include a roll-up to "United States" by looking at each record referenced by lower-level data structures nested under United States. The data management system may then look for "shoe" or similar terms (footwear, sandals, slippers, etc.) in the connected records from dimensions other than the location dimension.

Synonym-Enabled Search

Searches for precise terminology may not yield complete or accurate results if the precise terminology provided in a query do not match the precise terminology stored in the target record. In one embodiment, synonyms may be enabled for searches either as a background or default setting, or as a user-configurable toggle setting on a search interface. When synonyms are enabled for searches, the data management system uses thesaurus entries in combination with a received query to determine which terms should be searched. The terms in the received query may be expanded to include additional terms that are similar to the query terms, allowing records to be found even if the records do not use exactly the same terminology as the query. When synonyms are disabled, the data management system may use the search terms from the query without expanding the terms to include synonyms. In this scenario, records containing the synonyms but not the search terms would not show up in a result set for the query.

The thesaurus entries may be stored in a thesaurus separate from individual records, as metadata to individual records, or as part of individual records. The thesaurus entries may be indexed by the data management system so that records including any term in the thesaurus entry are identified by the thesaurus entry. The data management system may look for query terms indexed among the thesaurus entries to find record locations of the query terms and any other terms that are in a same synonym and/or acronym family as the query term. The location of the corresponding records is determined from the index, and the resulting records may be displayed in response to a user's query even though the resulting records themselves might not include any of the query terms.

In one example, a search for "customers in the United States" may, if synonyms are enabled, return results of customers in the USA", "US", "United States", "United States of America", or "America". The user interface then provides options to drill down into individual records in the search results, review results and change resulting records individually or in bulk, mark records as duplicates, mark records as good or bad examples of search results, modify the search, and/or delete records. For example, the user may change a column in common to several result records in bulk by selecting the column and typing in a new value for the column. The user interface may also include options for selecting all results, selecting none of the results, and/or individually selecting or de-selecting (e.g., via checkboxes) results for inclusion or exclusion in operations to perform on the selected records or columns of selected records.

Example entries in a thesaurus may include, for example: {California, CA, Cal, Cali, Golden State}, {IBM, Big Blue, International Business Machines, International Business Machines Corporation}, {Bruce Springsteen, The Boss}, {Ozzy Osbourne, Ozzy, Prince of Darkness}, {Lebron James, King James}, {Eldrick Woods, Tiger, Tiger Woods}, {Chevrolet, Chevy, General Motors}, {Coca-Cola, Coke, The Coca-Cola Company}, {Federal Express, FedEx, FedEx Corporation, Federal Express Corporation}, {The Walt Disney Company, Disney}, {Kentucky Fried Chicken, KFC}, {Meta, Facebook, FB, META, Meta Platforms, Inc., Facebook, Inc., TheFacebook, Inc.}, {Robert, Bob, Bobbie, Bobby, Rob, Robbie, Robby}, {Male, M, Man}, {Female, F, Woman}, etc.

Figure 3A:
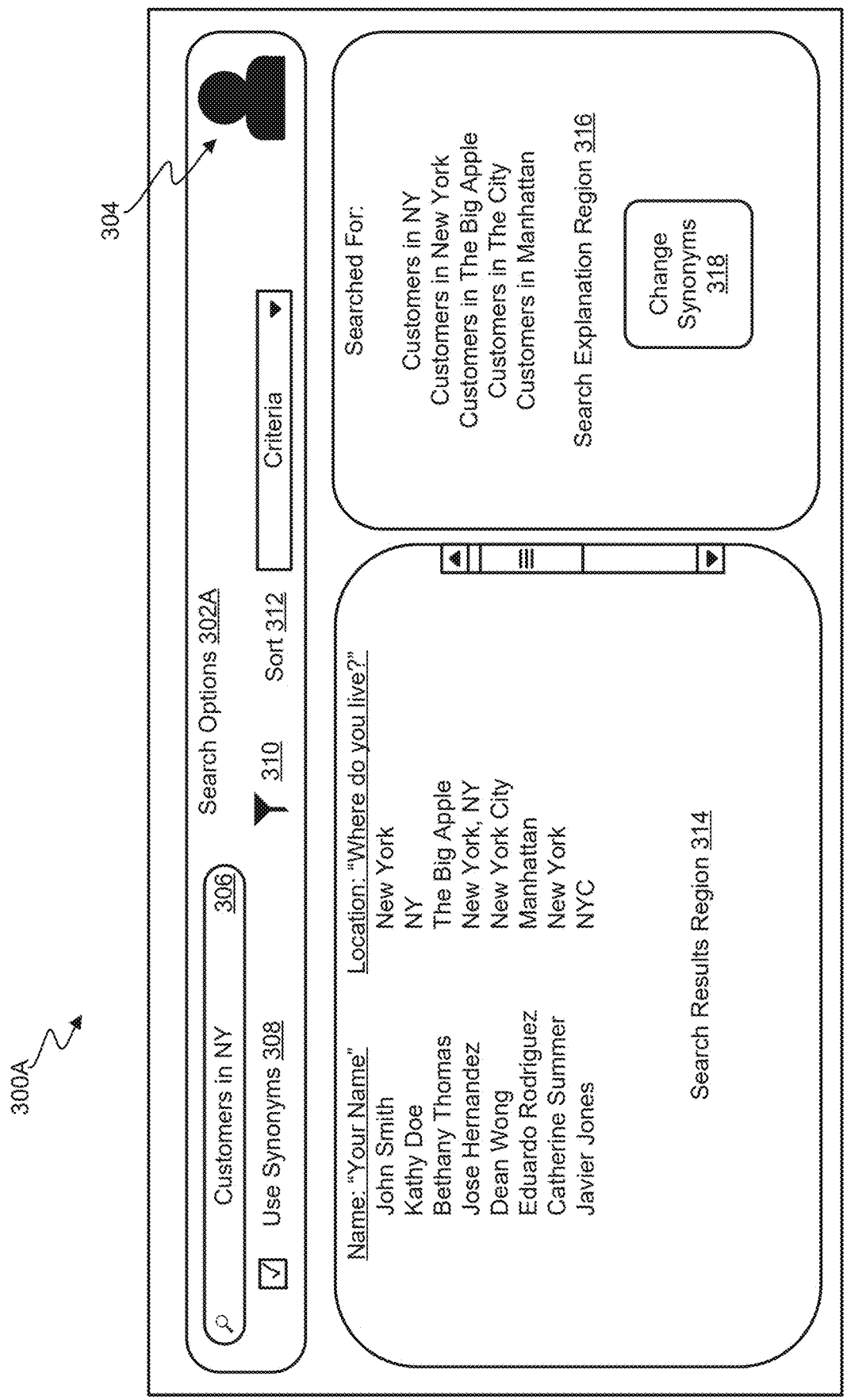
FIG. 3A illustrates a diagram of an example user interface showing expanded search results.

FIG. 3A illustrates a diagram of an example user interface 300A showing expanded search results. As shown, search options header 302A includes a search bar 306, an option to enable or disable synonyms 308, a filter 310, and a sorting option 312 for which sorting criteria may be specified. In the example, a user, indicated by user icon 304, is logged into user interface 300A and types in "Customers in NY" in the search bar 306 with the option 308 selected to use synonyms. Search results appear in a search results region 314. In the example, user interface 300A also includes a search explanation region 316 that explains how search results region 314 was populated. Search explanation region 316 also includes an option 318 to change synonyms that were used for the search inputted to search bar 306. In the example, selecting the option 318 may result in a thesaurus entry configuration interface for activating or de-activating certain terms for use in searches as synonyms or acronyms of "NY," such as user interface 300B of FIG. 3B.

Maintaining thesaurus entries with wide varieties of synonyms may be complicated. Although dictionary terms and their literal synonyms do not change frequently, company names, brand names, person nicknames, product offerings, city nicknames, and other information does change over time. In addition to synonyms and/or acronyms for a target term, thesaurus entries may also store known attributes of entities, such as a company's location, the company's products and services, the industry, the number of employees, the revenue, profit, and expense profile of the company, or any other information about the company or entity. Having a user attempt to add terms from past queries into the thesaurus may not yield positive results, as the terms may not be used frequently or may never be used again. Once a record is created, terms in the record could be expanded to their synonyms if such expansion did not consume user time.

Often, users creating records have little additional time to consider all of the various high confidence synonyms and/or acronyms that could exist for the terms they are using. Even if they had time, determining which synonyms and/or acronyms are highly likely to be associated with the terms of the record is not possible for an individual user to determine. Such associations may be based on information unknown to one user but known to another user who ultimately searches for the terms in a later search session.

In one embodiment, individual users may propose synonyms that may be accepted, rejected, or score-adjusted by other users. In this manner, generation and maintenance of the synonyms may be crowdsourced such that a group of users may collectively contribute to an expanding and contracting set of thesaurus entries covering an expanding and contracting set of synonyms and/or acronyms. Even if maintenance of the thesaurus entries is crowdsourced, individual users would still need to be incentivized to contribute to the crowdsourced solution. Without the individualized incentive, crowdsourcing becomes victim to a collective action dilemma, and the thesaurus entries end up being maintained by no one.

Figure 3B:
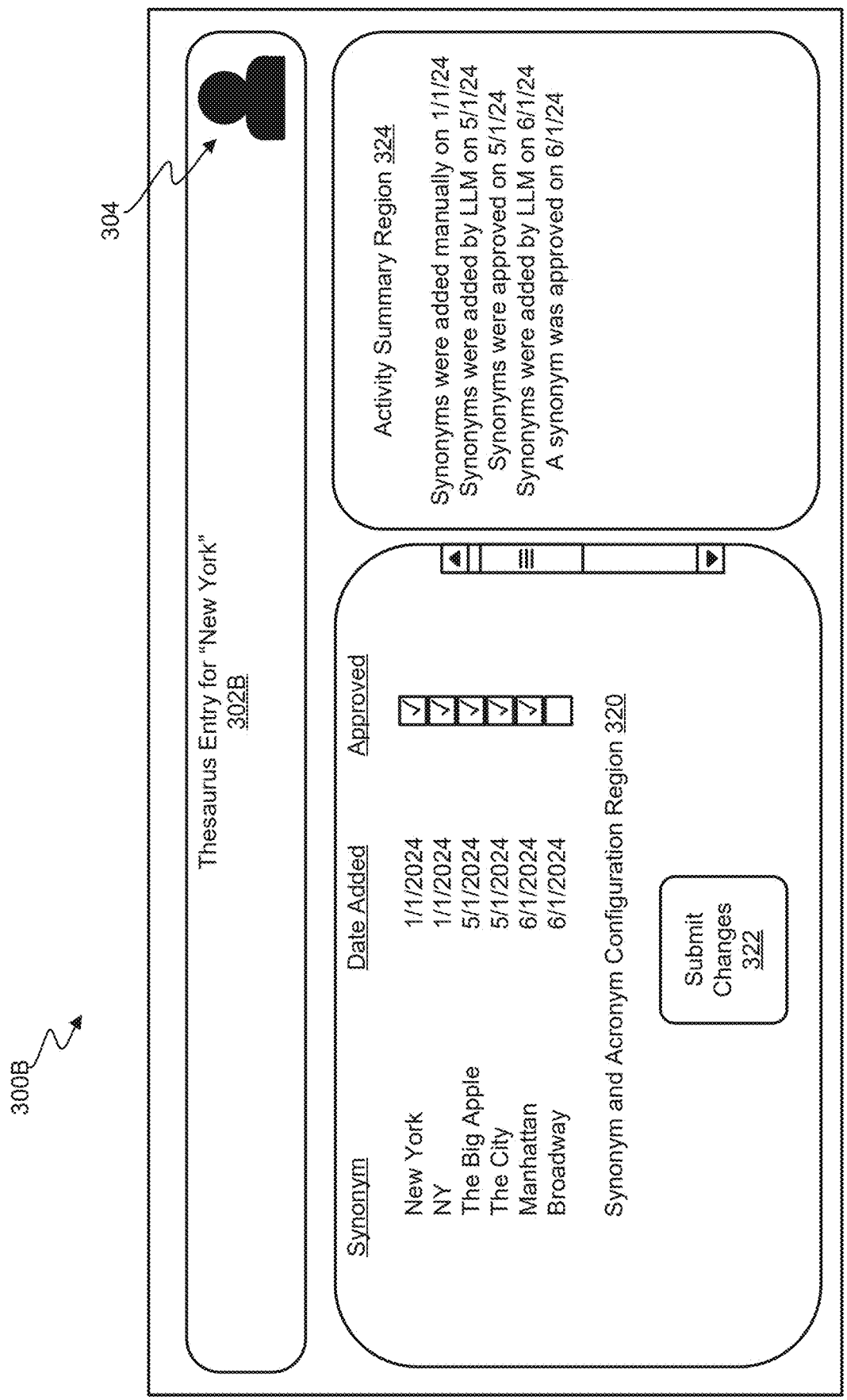
FIG. 3B illustrates a diagram of an example user interface showing synonym configuration.

FIG. 3B illustrates a diagram of an example user interface 300B showing synonym configuration. As shown header 302B describes a page for a thesaurus entry for "New York." The thesaurus entry includes synonym and acronym configuration region 320 for configuring synonyms and/or acronyms for a source term, "New York," including indicating whether the synonym or acronym is approved for use in search. Changes may be submitted via submit changes button 322. User interface 300B also includes an activity summary region 324, where a list of the most recent changes made to the thesaurus entry as well as date stamps of the changes are marked. Activity summary region may include details about what synonyms are changed, what user made the changes, statistics about searches that have used the thesaurus entry to find search results, and/or any other details about how the thesaurus entry has changed over time or has been used over time.

Automatic Exploration of Search Terms

In one embodiment, regardless of whether individual users contribute together in an organized or crowdsourced manner, synonyms are automatically generated by a large language model (LLM) as records get created or updated to include new terms. The new terms that either do not appear in thesaurus entries or appear in outdated thesaurus entries may be refreshed with the LLM to include more resulting terms. The LLM may also score the resulting terms based on a confidence that the resulting term represents the target term and/or based on whether the resulting term is offensive or inappropriate for use in a business context. The resulting terms may be automatically added to the thesaurus entries and may be automatically enabled for use or automatically marked for review. The thesaurus entries marked for review may be automatically enabled for use once approved.

FIG. 1 illustrates a flow chart of an example process 100 that intelligently expands search results ahead-of-time. Process 100 starts in block 102, where a record is accessed that includes a particular value. The record may be a newly added or updated record with synonyms enabled on an added or changed value, or a record that stores values that should be evaluated for expanded search, such as values that frequently occur in queries. In block 104, the data management system determines whether an updated thesaurus entry exists for the particular value.

Based at least in part on determining that the updated thesaurus entry does not exist for the particular value, in block 106, the data management system generates a prompt to discover a set of synonyms and acronyms for the particular value. Block 106 includes block 108, where a placeholder in a thesaurus prompt template is substituted with the particular value. The thesaurus prompt template includes a request for any synonyms and acronyms for the placeholder and specifies an output format. A large language model (LLM) is prompted in block 110 with the prompt to generate a set of resulting values in the output format.

In block 112, the set of resulting values are stored, along with a current date and an indication that one or more of the set of resulting values have not been approved. In block 114, a displayed option is selected that marks at least one of the resulting values as approved. Based at least in part on the selection, in block 116, the updated thesaurus entry is modified to indicate that the at least one of the resulting values is approved. In block 118, process 100 concludes with using the updated thesaurus entry to locate the record in response to a query including the at least one of the resulting values.

Figure 2:
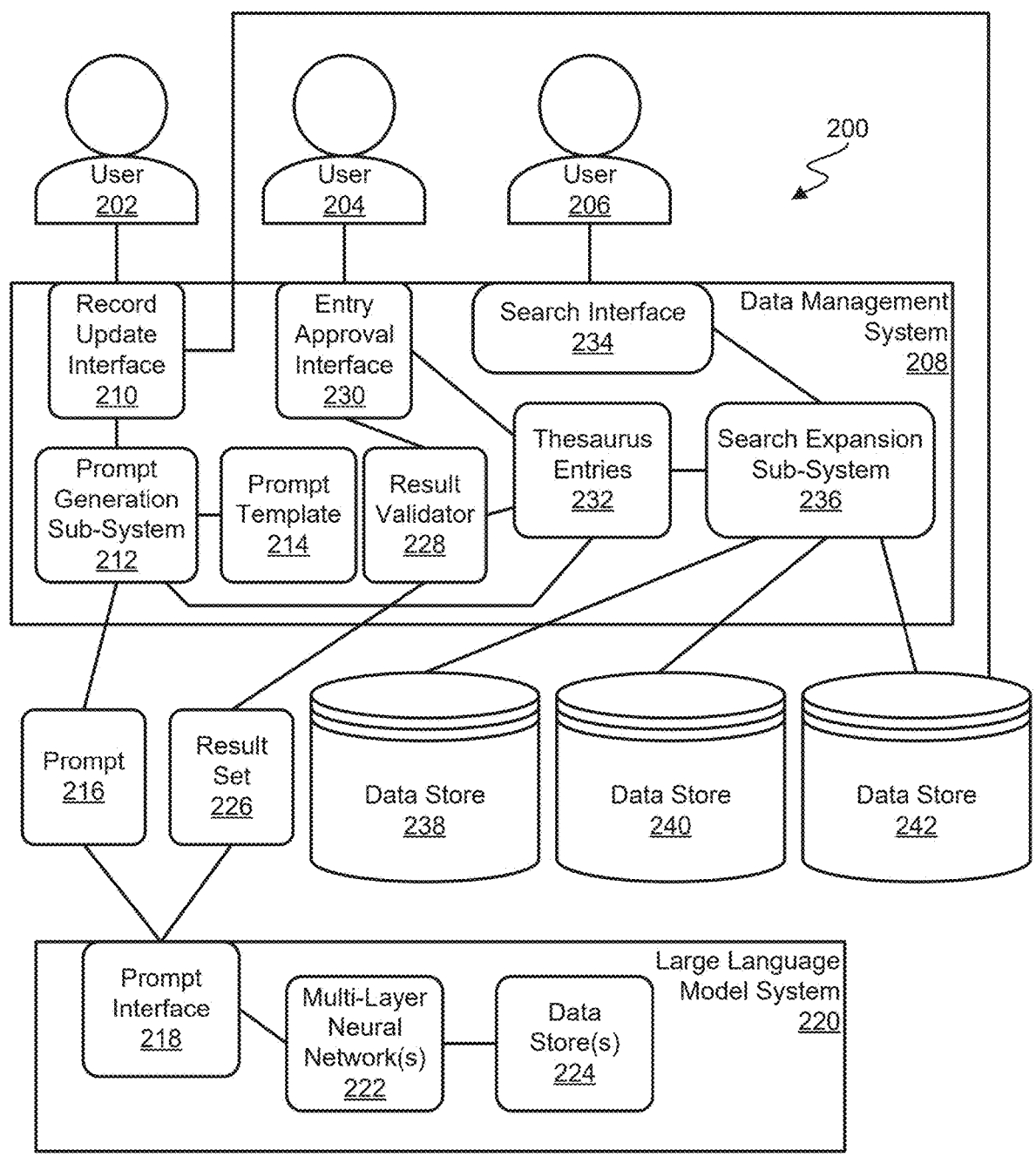
FIG. 2 illustrates a system diagram showing an example system that intelligently expands search results ahead-of-time.

FIG. 2 illustrates a system diagram showing an example system 200 that intelligently expands search results ahead-of-time. As shown, user 202 interacts with record update interface to update a record in data store 238, 240, or 242, such as data store 242 as shown. Prompt generation sub-system 212 analyzes updates received from record update interface 210 and/or data store 242 to determine whether any changed values are missing updated thesaurus entries in thesaurus entries 232. If there are any values missing updated thesaurus entries, prompt generation sub-system generates prompt 216 to prompt interface 218 of large language model system 220. Large language model system 220 feeds prompt 216 through multi-layer neural network(s) 222 with access to data store(s) 224 to generate result set 226, which is passed back to data management system 208. Result validator 228 validates the results as appropriate for storage in thesaurus entries 232. Result validator 228 may also prompt user 204, which may be the same or a different user than user 202, for approval of entries via entry approval interface 230. As a result, thesaurus entries 232 are updated.

User 206 may submit a query to search interface 234 of data management system 208. The query may be fed to search expansion sub-system, which uses thesaurus entries 232 to determine what terms to include when evaluating the query against data stores 238, 240 and 242. If a term of the query is found in the thesaurus entries 232, the associated terms in the corresponding thesaurus entry may be added disjunctively to the query for evaluation against data stores 238, 240, or 242. The query may be evaluated against data stores 238, 240, and 242 to produce a result set, which may be returned to user 206 via search interface 234.

In one embodiment, entries for a thesaurus may be requested from the LLM and populated synchronously or asynchronously based on entities created or otherwise updated in the data management system or search queries received in the data management system. For example, thesaurus entries may be populated asynchronously before the search request is received based on search criteria that have been received in the past for which no synonyms are available in the thesaurus. As another example, thesaurus entries may be populated synchronously in response to creation of a record that includes a term that does not appear in an updated thesaurus entry.

The data management system may also receive an explicit request to expand a term to support search. In this embodiment, the data management system may still check whether a relevant term is in an updated thesaurus entry that includes approved synonym(s) and/or acronym(s) for terms. If the term is not in the thesaurus entry, or if the user has elected to refresh the thesaurus entry anyway, the data management system may prompt a large language model to generate a list of synonyms and/or acronyms for the creating a new thesaurus entry for the term or expanding an existing thesaurus entry for the term. Then, the data management system stores a set of resulting synonyms and/or acronyms, optionally marked as unreviewed and temporarily inactivated.

A large language model (LLM) may be prompted for additional synonyms for a term or terms associated with a record value or a value from a search query, and the terms associated with the record or search query may be expanded or proposed for expansion based on the response from the LLM. The expanded terms may be stored in a thesaurus entry in an inactivated, de-activated, or activated mode and optionally placed in a queue for further review by a reviewing user such as a data manager or a user submitting a search query in a live session with the data management system.

An LLM can be used for master data management, to manage search terms for any kind of dimensionality, such as customers, vendors, locations, ATM machines, cost centers, accounts, etc. A user can search a tree or hierarchy of data based on any property or name. The cloud infrastructure allows a user to enable synonym-based searches, and an LLM may be used to update a database of synonyms for use in the synonym-based searches.

Once the thesaurus entry has been augmented with the synonyms and/or acronyms, the new customer record would be found as users search for terms that appear in the thesaurus entry. The large language model may be used to augment the synonyms as new records are created, and a human-in-the-loop may review proposed synonyms for new records before the synonyms are used to generate search results.

When performing or configuring searches on an interface of the data management system, the user may choose to enable synonyms for certain fields such as customer names, location names, and other fields, without enabling synonyms for accounting codes, revenue, or other fields for which there are no synonyms expected. A toggleable synonym setting may be displayed next to a field name in a field configuration interface, or in a record viewing interface that is accessible, for example, by selecting a record from search results or by browsing to the record in a hierarchy of records. In a particular example, as a new customer is added to a customer database, the customer name may be expanded using an LLM to all synonyms and/or acronyms with the customer name at the time the customer record is created in the system.

In various examples below, prompts may be provided to the LLM to expand a thesaurus for a potential search term.
Example Prompt 1
   Give me synonyms and acronyms for California
Example Response 1
   Golden State
   California Republic
   CAD
Example Prompt 2
   Give me synonyms and acronyms for New York
Example Response 2
   Big Apple
   NY
   The City
   Manhattan
Example Prompt 3
   Give me synonyms and acronyms for IBM Example Response 3
  International Business Machines Corporation
  IBMC
  Big Blue
  System/360
Example Prompt 4
  Give me synonyms and acronyms for Cisco
Example Response 4
  Synonyms:—
  Communication equipment
    Network provider
    Network solutions provider
    Telecommunication company
  And here are some acronyms for Cisco Systems:
    CSCO
    CISCO
    Cisco
Example Prompt 5
  Give me synonyms and acronyms for Oracle corporation.
Example Response 5
  Oracle Ltd. (OLED)
  Oracle Inc.
  Oracle Database Here are some acronyms for Oracle Corporation:
  ORCL
  OTC
  STK
Example Prompt 6
  Give me synonyms and acronyms for Trousers
Example Response 6
  1. Pants (PGA)
  2. Slacks (SLK)
  3. Breeches (BRKS)
  4. Dress pants (DNP)
  5. Jeans (DJN)

In various examples, the responses may be provided in a variety of formats. In order to reliably consume the responses, the data management system may request the responses in a particular format that is consumable as a set of items by the data management system, and the set of items may be added to a thesaurus entry for the target term.

Various LLMs may be used in conjunction with the techniques described herein, and the techniques are not limited to a specific brand or offering of LLM. In one example, a configuration command may be provided to the data management system in a session or connection of the user to select a particular large language model for use with generating data for the user. In one example, the "openai" large language model provider is chosen with named credentials. The model used may be, for example, gpt-3.5-turbo. Other example providers include, but are not limited to, Cohere, Azure AI, Google PaLM 2, etc. In various other examples, default credentials may be used by the data management system. In one embodiment, the credentials include user-specific credentials, such as a user-specific LLM session identifier, that allow the LLM service to switch between supporting different users within the same LLM session using the same LLM connection credentials. In this embodiment, context from a given user may be retrieved using the LLM session identifier before processing the prompt for synthetic data generation for the user.

Prompt Structure

In one embodiment, the data management system requests results in a format that uses delimiters or a predictable marker to distinguish items in the set from each other. The prompt may include any number of formatting criteria for the results, such as specifying delimiters, specifying data types, specifying maximum value lengths, specifying target language(s), etc. For example, the prompt may specify that the results are to be provided in an array or list, as well as providing an example list including delimiters (commas, semicolons, braces, brackets, parenthesis, etc.) to show the LLM where delimiters should go in the actual response. The prompt may specify which delimiters to use with or without providing examples. Also with or without providing examples, the prompt may specify what data types the results should be provided in, by providing the result name preceded by a data type, such as "integer" or "string" or "number" or "alphanumeric value." The prompt may also request code-consumable results in valid JSON, XML, Java classes, or any other markup or structural format.

In various examples, the prompt to the LLM may include more guidance or context to produce better results from the LLM. For example, the prompt may include examples of terms that have been input and good examples of output synonyms or other expansions for those terms. In one embodiment, the examples are selected based on the column for which a synonym is being sought. For example, an example being selected for inclusion in a prompt for a synonym of a term may use an example from the same column or from a column with a similar format, a same or similar data type (string, numeric, alphanumeric, short text, long text, same or similar character limit such as within a relative threshold or percentage of the same character limit, etc.) as the term. For example, a prompt for a synonym for a particular company name may use a good example of synonyms that have been generated for a different company name. As another example, a prompt for a synonym for a company name may use a good example of synonyms that have been generated for a product name that is within a threshold percentage of the same number of characters as the company name.

The examples may provide synonyms of different types, such as a synonym based on financial data (e.g., a ticker symbol for a company), a synonym based on product information (e.g., a primary product for a company), a synonym based on location (e.g., a nickname including a headquarters city), or any other type of synonym. The examples may include examples of the different types to prompt the LLM to produce examples of each of the different types.

In one embodiment, the examples are selected based on one or more characteristics associated with the value for which synonyms or acronyms are being requested. For example, the characteristic may be a characteristic such as a character limit or data type of a column holding the value, a category of the value among a plurality of categories in a topology of categories, a length of the value, a name or description of the column holding the value, a record type of the record holding the value, or any other characteristic of the value. Examples having similar characteristics may be selected from a library of examples that have been marked as approved or, optionally, marked as exemplary by a user. The output format for the request may be specified by providing the examples in the desired output format, using desired delimiters, and/or the output format may be specified separately in the request.

The prompt may also include guidance to steer the content such as "do not include offensive language" or "ensure the results are appropriate in a business context." If a synonym is being requested for a value that includes multiple terms or a phrase of terms, the guidance in the prompt may include criteria for determining how much text to include in a resulting value. Such guidance may be determined based on a range of existing values in the column, after determining that the range of values comply with certain criteria. For example, the guidance may specify that resulting values "should be 3-5 words or less in length," "should be written in first person perspective," or "should be written in third person perspective."

In various embodiments, the prompt may request a score for each resulting value provided by the LLM. Examples scores include an offensiveness score with higher or lower scores meaning the resulting term is more likely to be offensive, a formal versus informal score with higher or lower scores meaning the resulting term is more likely to be less formal, and/or a confidence score with higher or lower scores meaning the resulting term is more likely to be uniquely or commonly associated with the target term. The LLM may provide resulting values with scores, and the scores may be stored in a thesaurus entry for the target value. The scores may be reviewed by a user in a thesaurus entry configuration interface for determining which synonyms and/or acronyms to enable or disable for search. The scores may also be used to automatically enable or disable certain terms from search, in the absence of separate user review or optionally even in the presence of separate user review if the term is deemed offensive.

Expansion of Search Terms to Entity-Related Terms

In one embodiment, a thesaurus entry for a source or target ("source" and "target" being used interchangeably herein) term may include not just synonyms for the term itself but synonyms for products or services offered by an entity represented by the term, people associated with the entity, and/or past names or subsidiaries of the entity. These synonyms may also be expanded via prompts to the LLM. For example, an initial thesaurus entry for Oracle Corporation may include {Oracle Corporation, Oracle, Oracle Corp., ORCL}. The thesaurus may be expanded by prompting the LLM not just for synonyms or nicknames of Oracle Corporation but also for names and nicknames of products or services offered by Oracle Corporation. The expanded thesaurus entry resulting from the LLM prompt may include:

{Oracle Corporation, Oracle, Oracle Corp., ORCL, Oracle Database, Oracle Cloud Infrastructure, Oracle Fusion Applications, Oracle ERP Cloud, Oracle HCM Cloud, Oracle CX Cloud, Oracle MySQL, Oracle Autonomous Database, Oracle Java, Oracle Linux, Oracle Exadata, Oracle GoldenGate, Oracle E-Business Suite, Oracle NetSuite, Oracle Analytics Cloud, Oracle Data Integration, Oracle Blockchain Platform, Oracle Cloud Applications, Oracle Cloud Infrastructure as a Service, Oracle Cloud Platform as a Service}.

In the same or a different embodiment, the thesaurus may be expanded to include prominent people associated with the entity. In this embodiment, the expanded thesaurus entry resulting from the LLM prompt may include:

{Oracle Corporation, Oracle, Oracle Corp., ORCL, Oracle Database, Oracle Cloud Infrastructure, Oracle Fusion Applications, Oracle ERP Cloud, Oracle HCM Cloud, Oracle CX Cloud, Oracle MySQL, Oracle Autonomous Database, Oracle Java, Oracle Linux, Oracle Exadata, Oracle GoldenGate, Oracle E-Business Suite, Oracle NetSuite, Oracle Analytics Cloud, Oracle Data Integration, Oracle Blockchain Platform, Oracle Cloud Applications, Oracle Cloud Infrastructure as a Service, Oracle Cloud Platform as a Service, Larry Ellison, Safra Catz, Andy Mendelsohn, Edward Screven, Steve Miranda}.

In the same or a different embodiment, the thesaurus may be expanded to include past names or subsidiaries of the entity. In this embodiment, the expanded thesaurus entry resulting from the LLM prompt may include:

{Oracle Corporation, Oracle, Oracle Corp., ORCL, Oracle Database, Oracle Cloud Infrastructure, Oracle Fusion Applications, Oracle ERP Cloud, Oracle HCM Cloud, Oracle CX Cloud, Oracle MySQL, Oracle Autonomous Database, Oracle Java, Oracle Linux, Oracle Exadata, Oracle GoldenGate, Oracle E-Business Suite, Oracle NetSuite, Oracle Analytics Cloud, Oracle Data Integration, Oracle Blockchain Platform, Oracle Cloud Applications, Oracle Cloud Infrastructure as a Service, Oracle Cloud Platform as a Service, Larry Ellison, Safra Catz, Andy Mendelsohn, Edward Screven, Steve Miranda, Sun Microsystems, PeopleSoft, BEA Systems, Siebel Systems, Hyperion Solutions, MySQL AB, NetSuite, Datalogix, Taleo, Micros Systems}.

With the expanded list, the data management system may explicitly search for each of the synonyms associated with "Oracle Corporation" in any documents or records of a searched collection when the term "Oracle Corporation" appears in a search query.

In various other embodiments, the thesaurus entry for an entity may be expanded to include one or more industries of an entity, one or more locations of an entity, one or more sectors or other categories of an entity, one or more hierarchies or topologies that include the entity, or any other information associated with the entity. Any such thesaurus entry may be generated by prompting the LLM with the source term and a stated context (products, subsidiaries, prominent people, industry, location, category, etc.) and receiving terms based on the source term and having the stated context.

In one embodiment, the thesaurus also includes antonyms or negating indicators requested from the LLM. The antonyms or negating indicators may be used to suppress an entity in search results when the antonym is being used for the search. For example, the antonyms or negating indicators may be requested for Oracle Corporation and may include terms that, if present with "Oracle" and "Corporation," still make it less likely that the text is referring to the Oracle Corporation entity. For example, a negating indicator for Oracle Corporation may be "prophecy," "The Matrix," "Trelawney," or "Harry Potter," as those uses of "oracle" (e.g., as a prophetic person) likely do not refer to Oracle Corporation. In some use cases, "IBM" may be a negating indicator for "Oracle Corporation" if the two companies are unlikely to be referenced in the same document. In other scenarios where the documents discuss database products across different vendors, IBM and Oracle may occasionally appear in the same documents even though they are not synonyms.

In some embodiments, particular search queries may be directed to one entity and its synonyms while excluding another entity and its synonyms. For example, the search query may be for IBM and all of the synonyms with IBM, excluding Oracle and Microsoft and all of the synonyms relating to Oracle and/or Microsoft. Such limitations may be submitted using the "NOT" operator in the search query. For example, the query may be "IBM AND NOT Oracle AND NOT Microsoft," with synonyms enabled, to exclude documents matching Oracle and Oracle's synonyms and Microsoft and Microsoft's synonyms, while still covering the remaining documents matching IBM and IBM's synonyms as long as the documents did not also match Oracle, Oracle's synonyms, Microsoft, or Microsoft's synonyms. In other examples, the search settings may allow a search query to be expanded based on synonyms that are unique to an entity, synonyms even if they are not unique to the entity, or without expanding the search to any synonyms at all.

Automatic Scoring, Ranking, and Filtering Search Terms

In one embodiment, for each synonym or acronym that is generated by the LLM for a target or source term, the LLM is prompted to determine a confidence that the resulting term is used as a synonym for the source term, a likelihood that the resulting term is offensive, and/or a likelihood that the resulting term is used in a formal business context. An example prompt may include: "In the format of '{(string nickname, integer confidence, integer likelihood), (string nickname, integer confidence, integer likelihood)}', provide a list of nicknames, synonyms and/or acronyms for International Business Machines, Inc. For each item in the list, provide a confidence (1-10 with 10 the highest) that the term is used synonymously with International Business Machines, Inc., as well as a likelihood (1-10 with 10 the highest) that the term would be considered offensive. An example response to the prompt, as produced by GPT-4 by OpenAI, may include: "{(IBM, 10, 1), (Big Blue, 9, 1), (IBM Corp., 8, 1), (I.B.M., 9, 1), (The Blue Giant, 6, 1), (Big Blue Computing, 5, 1), (Blue Chip Computing, 4, 1), (IBM Corporation, 7, 1), (International Business Machines, 8, 1), (The Blue, 3, 1)}" Another example for Meta Platforms, Inc. may be "{(Meta, 9, 1), (Facebook, 8, 1), (TheFacebook, 6, 2)}'."

The response may be consumed to add, to a corresponding thesaurus entry, the synonyms for International Business Machines, Inc., as well as storing a confidence score (e.g., the requested "confidence") of how likely the synonym refers to International Business Machines, Inc., and a sensitivity score of how likely the term is to be considered offensive (e.g., the requested "likelihood"). The data management system may use the confidence scores to rank search results generated using higher scored synonyms higher than search results generated using lower scored synonyms. The data management system may also use the sensitivity scores to rank search results generated using lower scored synonyms higher than search results generated using higher scored synonyms.

The data management system may also block search results for terms that are below a threshold confidence score and/or terms that are above a threshold sensitivity score. The data management system's search settings may be configured via a search configuration interface that allows the threshold confidence score and/or the threshold sensitivity score to be adjusted.

In one embodiment, scores are stored in the thesaurus entry for a target term. The scores may be used to display information to the user to aid in approving or rejecting the term. In a particular embodiment, scores of resulting values may be used to generate a recommendation of whether to approve or reject the resulting value. For example, terms with sensitivity scores above a threshold may be recommended for rejection, and/or terms with confidence scores below a threshold may be recommended for rejection. As another example, terms with sensitivity scores above a same or different threshold may be recommended for approval, and/or terms with confidence scores above a same or different threshold may be recommended for approval. The recommendation may be displayed on a user interface for reviewing the proposed terms, and input from the user in response to the recommendation may be used to update the corresponding term in the thesaurus entry as approved or rejected, or to adjust any scores associated with the term.

Automatic Expansion of Search Terms

In one embodiment, thesaurus entries may be updated automatically in response to entities created or updated in the data management system or search queries received in the data management system. A large language model (LLM) may be prompted for additional synonyms for a term or terms associated with the entity or search query, and the terms associated with the entity or search query may be expanded based on the response from the LLM. In one embodiment, the expanded terms are automatically activated and available for use in future search queries to find synonymous terms.

In various embodiments, the data management system may determine to expand search terms for a term in response to storing a record that includes the term, in response to analyzing terms without synonyms in records such as frequently accessed records, in response to an individual query that includes the term, and/or in response to analyzing a group of queries that frequently use the term.

In one embodiment, the automatic (automated activation of newly generated terms for search) or semi-automatic (automated generation of candidate terms for review prior to activation) expansion of search terms is triggered based on whether an updated thesaurus entry exists for a source value. If an entry exists for the source value, the entry might not have been updated within a threshold amount of time to be considered non-stale. The data management system may determine that the entry does not exist, that the entry exists but is stale, or that the entry exists and is not stale. If the entry does not exist or exists and is stale, the data management system may automatically generate new candidate terms for the source entry by prompting an LLM. In the scenario where an entry exists but is stale, the new candidate terms may replace any existing terms for the entry or may supplement existing terms for the entry. The entries may be automatically enabled for use in search or may be marked as unapproved and trigger a manual, synchronous or asynchronous, review by a user to approve the terms.

In one embodiment, a source value that triggers automatic expansion of search terms for the source value may be detected from a record that a newly created or updated to include the source value. For example, the source value may be newly added to a column for which automatic search expansion is enabled. In this scenario, adding the source value to the column triggers a check for whether an updated thesaurus entry exists for the source value and, if not, triggers an automatic generation of resulting terms to include in an updated thesaurus entry. If an updated thesaurus entry already exists, in one embodiment, no further action is taken other than to update a search index to indicate that the record includes a term in the updated thesaurus entry.

In the same or a different embodiment, a source value that triggers automatic expansion of search terms may be mined from a plurality of values that have been gathered as frequent search terms or otherwise based on how frequently the terms appear as search terms. The frequent search terms may be stored in a record, and the data management system may periodically check whether an updated thesaurus entry exists for each of the frequent search terms. If not, the data management system may trigger automatic generation of resulting terms to include in an updated thesaurus entry. If an updated thesaurus entry already exists, in one embodiment, no further action is taken.

Automatic Screening of Expanded Search Terms

In one embodiment, a synonym or acronym is generated that is offensive, slang, or otherwise sensitive and is not desirable to be used in a business context. In this embodiment, the offensiveness of the synonym or acronym may be first reviewed automatically by the data management system to determine if the synonym or acronym passes a first filter of synonyms or acronyms that are not allowed to be proposed for review by a reviewing user and/or are not allowed to be used as synonyms or acronyms in a production system due to their sensitive nature. Sensitive terms may be filtered based on a manually maintained blacklist of sensitive terms and/or by a blacklist of sensitive terms that is periodically updated by prompting an LLM for a list of "sensitive or offensive nicknames," or by asking an LLM if any entries in an existing thesaurus are sensitive. The entries in the thesaurus may be used one-time or periodically cycled through the LLM to ensure that potentially sensitive terms are de-activated and queued for review by a reviewing user.

In either synchronous or asynchronous review, terms may be shown to a user with an option to mark any of the terms as offensive or otherwise sensitive. The sensitive terms may be added to a sensitive term blacklist based on the synchronous or asynchronous feedback, and the terms on the sensitive term blacklist may be blocked from being sent to reviewing users for review and may also be blocked or prevented from activation, such that the term is prevented from use in responding to search queries.

Once a term has been blacklisted as offensive or sensitive for one entity, the term may remain in the blacklist of sensitive or offensive terms and be unavailable as sensitive or offensive for use as synonyms or acronyms for other entities. For example, the term "troll" may be determined to be a sensitive term that is inappropriate for use with any entity. In another example, one or more exceptions may be made to the blacklisted terms with a manual override that allows the term to be used with a particular entity. In the case of "troll" for example, an exception may be made to allow the term "troll" to be used in synonyms or acronyms for "troll company clothing," an apparel company.

In one embodiment, different entities may have overlapping synonyms or acronyms. For example, International Business Machines, Inc. and Oracle Corporation may both have a synonym of "Database Vendor." The data management system may detect that both companies have the same stored synonym and reduce the confidence score that the term refers to either company in particular. The confidence threshold may be adjusted when searching to include or exclude lower confidence matches. In this manner, the database management system supports broad searches that tolerate low-confidence matches to find information about potentially a variety of entities, as well as supporting narrow searches that do account for some synonyms but tolerate only high-confidence matches to find information about a particular entity. For example, a broad search for a company whose products include "database" may include International Business Machines and Oracle Corporation records in a result set, or a narrow search for agreements with Oracle may include only those agreements that are with a company identified as Oracle, Oracle Corporation, Oracle Corp., or ORCL, which are the highest-confidence entries. If subsidiaries are included according to the search settings, the subsidiaries or alternative or past company names may be ranked as high-confidence subsidiaries or alternative company names listed in the thesaurus, such as Sun Microsystems, PeopleSoft, BEA Systems, Siebel Systems, Hyperion Solutions, MySQL AB, NetSuite, Datalogix, Taleo, or Micros Systems.

A data manager may be notified when a synonym or acronym overlaps in the thesaurus. For example, an email may be triggered to the data manager indicating which terms newly overlap (e.g., due to changes that day, week, or month) for different source terms in the thesaurus, and which entities those overlapping terms are indicated to be synonymous with. The email may also include a confidence score currently stored for the overlapping term and each separate synonym, as well as an option to adjust the confidence score up or down to reflect a stronger or weaker tie of the term with some synonyms over others.

In various embodiments, expanded search terms and/or feedback on expanded search terms may be analyzed by a machine learning model for sentiment, offensiveness, business risk, whitelisted terms, blacklisted terms, detecting hallucinations, and/or any other analysis of the expanded search terms to automatically mark the expanded search terms as enabled for use, disabled for use, and/or queued for further review. Analysis of the expanded search terms may apply one or more criteria to downgrade or upgrade a score for the search term, or to add the term to a blacklist or whitelist. Analysis of the expanded search terms may generate one or more scores, and the scores may be presented to the user in further review to approve or reject the search terms.

Search terms that have been analyzed and removed from consideration may also be removed from a review queue for a reviewing user. The reviewing user may be prompted to review any terms that are still awaiting approval after terms that have been excluded based on the automated analysis are removed or omitted from the list.

Asynchronous Review of Expanded Search Terms

In one embodiment, end users or data managers may provide feedback to mark entries in the thesaurus with positive or negative feedback. The user might choose to avoid certain acronyms or synonyms that create ambiguities with other records that exist in the database, depending on user preference in a feedback or other verification step. Negatively marked items may be temporarily removed from the thesaurus, permanently removed from the thesaurus, removed and queued up for further review, or have their score as a valid synonym adjusted downwardly. Positively marked items may have scores increased for more prevalent use as a valid synonym, resulting in higher ranking search results.

In an embodiment, a notification is triggered to a reviewing user such as the user who submitted the query or an owner or manager of the data store who are responsible for managing the quality of the data in the data store. The notification may be to a different user than the one who is logged in. The notification may include proposed synonyms and an option to confirm or reject proposed synonyms before the proposed synonyms are activated for use in search.

If a synonym or acronym is approved for addition to the thesaurus as "confirmed" by the data owner and/or end-user, the synonym or acronym may be used in production to support searching and browsing functionality in the data management system.

If a synonym or acronym is reviewed for addition to the thesaurus and is rejected by the data owner and/or end-user, the synonym or acronym may be removed from the thesaurus or de-activated in the thesaurus and marked as "rejected" to avoid further review by the data owner and/or end-user. The de-activated terms in the thesaurus are not used as synonyms or acronyms to augment search queries.

The data management system may also provide an option for blacklisting a term proposed as a synonym or acronym for a source term. The blacklisted term may be blacklisted for all source terms, for a subset of source terms identified by the reviewing user, and/or for all but an exception set of terms identified by the reviewing user. The term may be stored in a blacklist along with an indication of whether the term is blacklisted for all, a subset, or all but a subset of source terms, along with an identification of the subset if the term is blacklisted for fewer than all of the source terms.

In one embodiment, even if a term is not blacklisted and whether feedback on the term is provided synchronously or asynchronously, the term may be assigned a high sensitivity score or a low confidence score by the feedback, via a term review interface, for example, to prevent the term from being used to generate search results unless the user has elected to use low confidence terms or highly sensitive terms in generating the search results. In this embodiment, a term may be newly assigned a confidence score or sensitive score by a reviewing user, or the reviewing user may override a confidence score or sensitivity score generated by a large language model (LLM) for the term. For example, the confidence score and/or sensitivity score may have been generated when the term was generated by the LLM.

An advanced search configuration interface may include option(s) to adjust the threshold confidence score and/or threshold sensitivity score applied to the search. As adjusted, the search may use only those synonyms that satisfy the confidence or sensitivity thresholds specified in the advanced search configuration interface.

The confirmation, rejection, or blacklisting of a synonym may also trigger a separate notification to the data manager that terms have been added to or removed from the thesaurus. Rejected search terms may be marked as rejected on a corresponding thesaurus entry and removed from a reviewing user's queue for review. Rejected terms or de-activated terms are not used by the data management system in generating search results in response to search queries. If a user searches for a term that has been rejected, the data management system might not be able to locate the record unless the search includes other terms that are associated with the record.

Synchronous Feedback and Customization of Expanded Search Terms

Negative feedback may be provided, for example, in response to search results that do not match the search query. The individual search results may be down-ranked. Down-ranking an item that appeared on the list because of a given thesaurus entry, which would not have occurred but for the given thesaurus entry, may cause the given thesaurus entry to be deactivated or marked for further review.

In another embodiment, a searching user seeing inaccurate results may adjust synonyms that are being used for the search on-the-fly by manually inputting, confirming, or rejecting synonyms available for use in the search. The adjustments may be provided in advanced search options after seeing inaccurate search results.

Positive feedback may also be provided when performing a search, either implicitly or explicitly. Implicit positive feedback may include clicking through to a record that appears on a search result screen, indicating implicitly that the record and any search terms used to locate the record were appropriate. Explicit positive feedback may include a user selecting a "more like this" option when viewing results. The explicit positive feedback indicates that the result and any search terms used to locate the result were appropriate.

In yet another embodiment, a search query may include an option to include or exclude synonyms and acronyms for use in execution of the search query. Synonyms or acronyms may be enabled or disabled generally, as a whole, or may be enabled or disabled individually based on synonyms or acronyms applicable to a given search.

In one embodiment, a search query may be shown to the user as a modified search query in an augmented form that includes synonyms or acronyms from the thesaurus. In this embodiment, the user may see synonyms or acronyms substituted in the query. The original query may search for "Companies in California who license Acme, Inc. Enterprise Service," and the original query may be augmented to "Companies in (California OR CA OR Cal OR Cali OR Golden State) who license (Acme, Inc. OR Acme OR Acme Incorporated) Enterprise Service." In one embodiment, the modified search query is shown to the user along with results for the modified search query. The modified search query may be further modified by the user to remove disjunctive items that were previously automatically added to the list of disjunctive items based on the thesaurus.

Computer System Architecture

Figure 4:
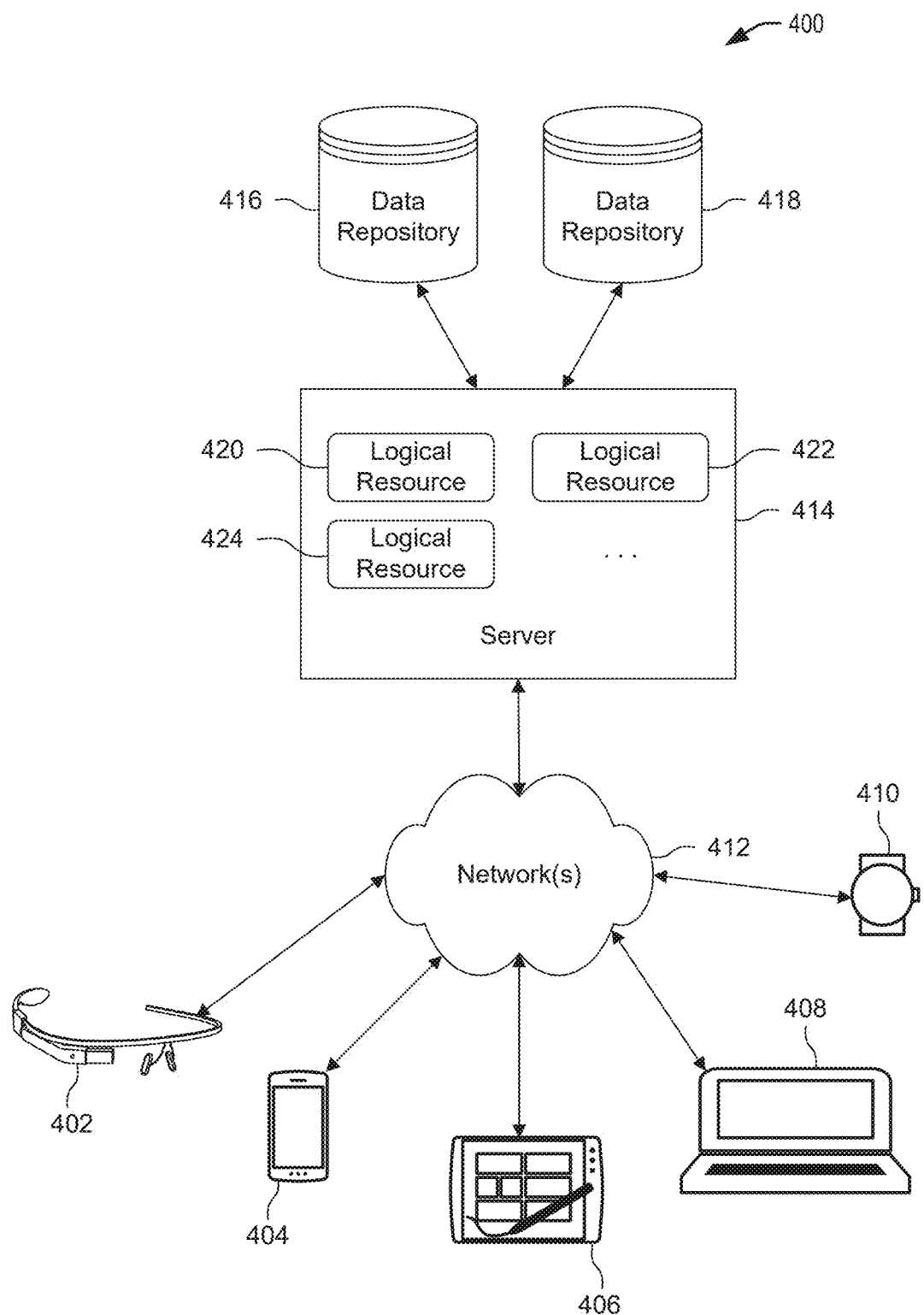
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Clients computing devices 402, 404, 406, 408, and/or 410 may be configured to execute one or more applications.

In various aspects, server 414 may be adapted to run one or more services or software applications that enable techniques for intelligently expanding search results.

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for intelligently expanding search results in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android™, HarmonyOS®, Tizen®, KaiO®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for intelligently expanding search results. Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
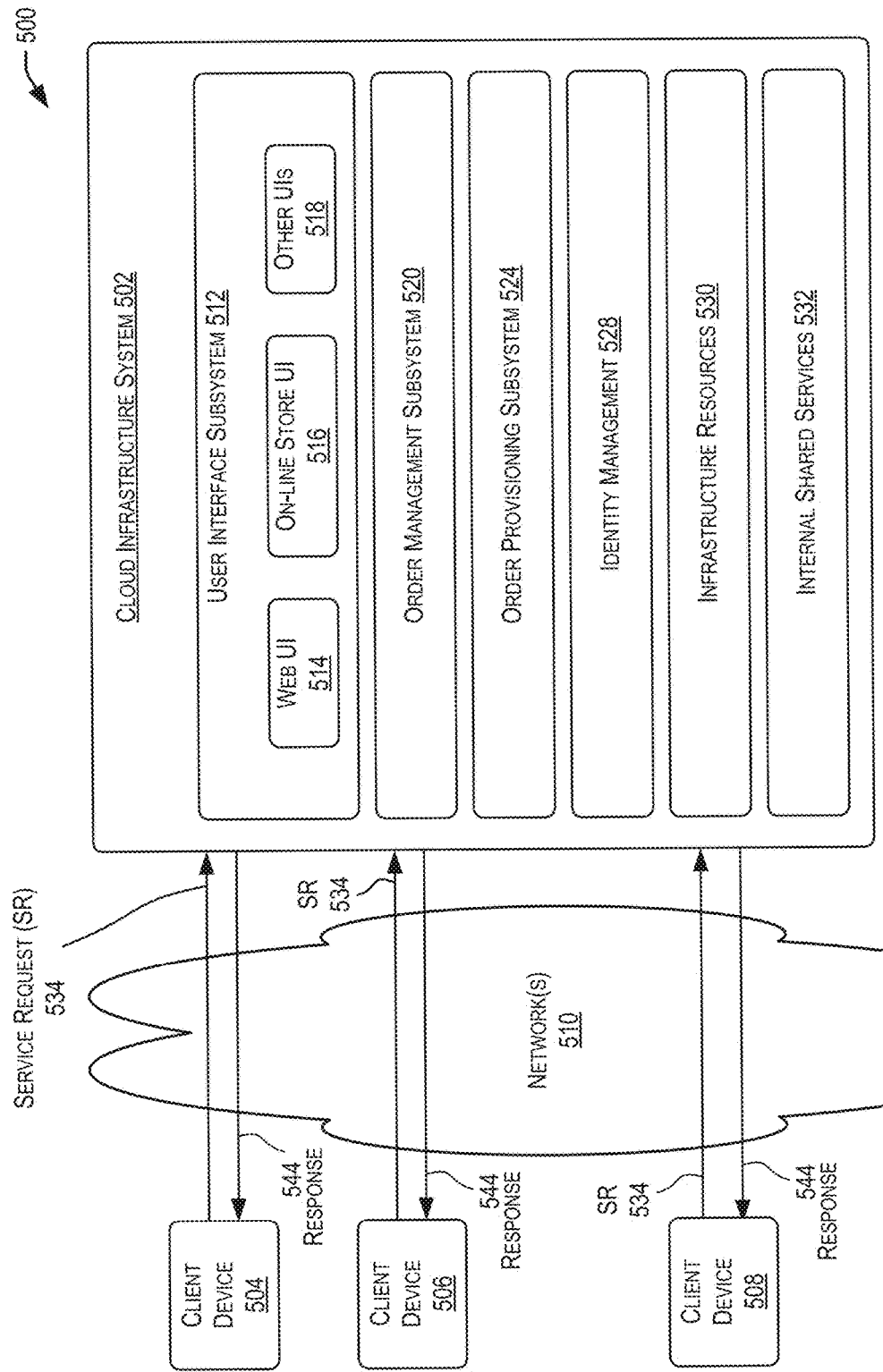
FIG. 5 is a simplified block diagram of one or more components of a system environment by which services provided by one or more components of an embodiment system may be offered as cloud services, in accordance with certain aspects.

FIG. 5 is a simplified block diagram of a cloud-based system environment in which intelligently expands search results, in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation*, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502.

In some aspects, the processing performed by cloud infrastructure system 502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to.

In certain aspects, such as the embodiment depicted in FIG. 5, cloud infrastructure system 502 may comprise an order management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
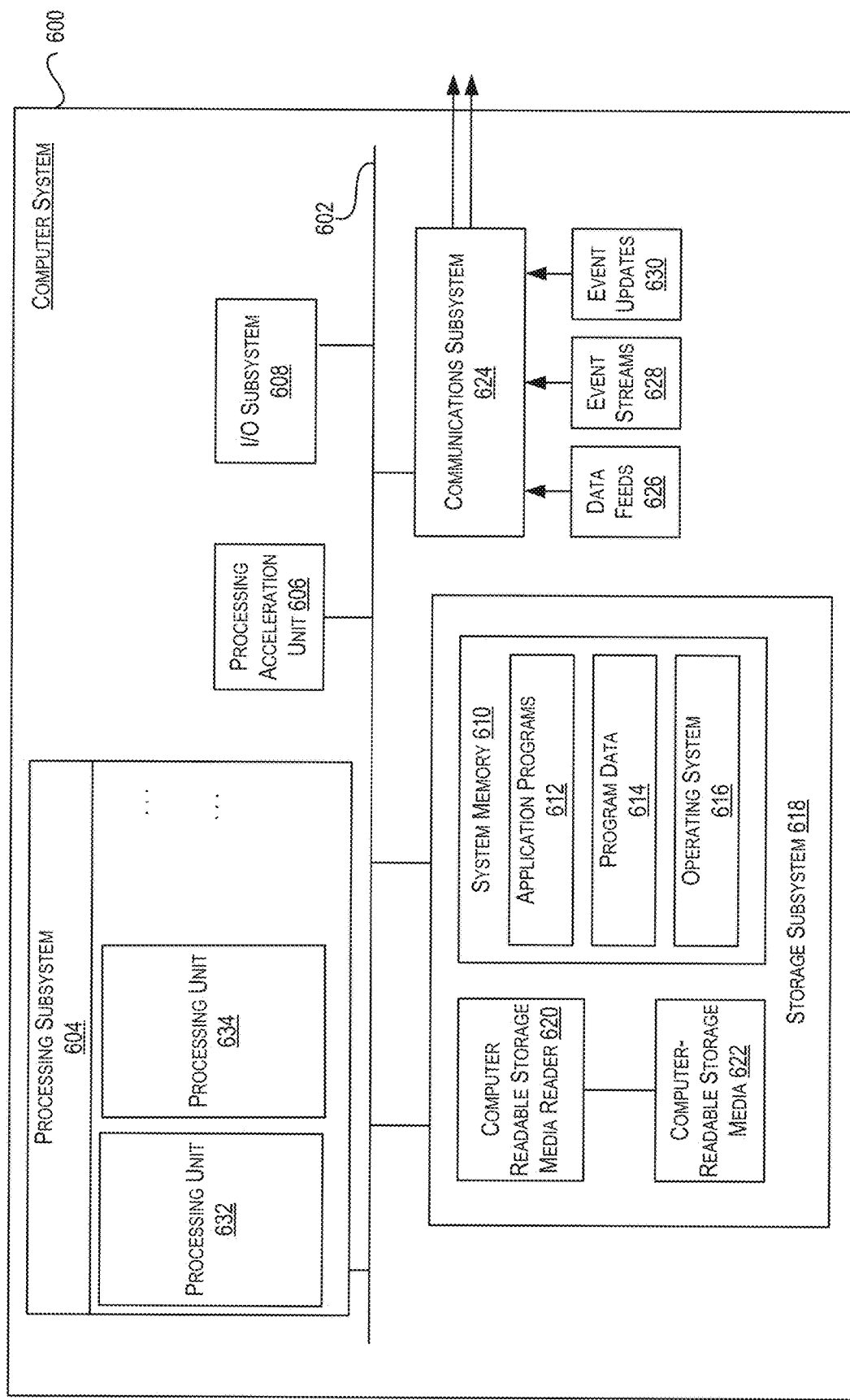
FIG. 6 illustrates an example computer system that may be used to implement certain aspects.

FIG. 6 illustrates an exemplary computer system 600 that may be used to implement certain aspects. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
accessing a record comprising a plurality of values, the plurality of values including a particular value;
determining whether an updated thesaurus entry exists for the particular value;
based at least in part on determining that the updated thesaurus entry does not exist for the particular value, generating a prompt to discover a set of synonyms and acronyms for the particular value at least in part by substituting a placeholder in a thesaurus prompt template with the particular value, wherein the thesaurus prompt template comprises a request for any synonyms and acronyms for the placeholder, and wherein the thesaurus prompt template specifies an output format;
prompting a large language model with the prompt to generate a set of resulting values in the output format;
storing, as at least part of the updated thesaurus entry for the particular value, the set of resulting values, a current date, and an indication that one or more resulting values of the set of resulting values have not been approved;
causing display of the particular value, the one or more resulting values, and an option to mark any of the one or more resulting values as approved;
receiving a selection of the option that marks at least one resulting value of the one or more resulting values as approved;
based at least in part on the selection, modifying the updated thesaurus entry to indicate that the at least one resulting value is approved;
using the updated thesaurus entry to locate the record in response to a query comprising the at least one resulting value, wherein the record as stored did not include the at least one resulting value as part of the record.

2. The computer-implemented method of claim 1, wherein determining whether the updated thesaurus entry exists for the particular value comprises determining whether an existing thesaurus entry for the particular value has been updated within a threshold amount of time, and wherein determining that the updated thesaurus entry does not exist for the particular value comprises determining that the existing thesaurus entry has not been updated within the threshold amount of time.

3. The computer-implemented method of claim 1, wherein determining whether the updated thesaurus entry exists for the particular value comprises determining whether any thesaurus entry exists for the particular value, and wherein determining that the updated thesaurus entry does not exist for the particular value comprises determining that no thesaurus entry exists for the particular value.

4. The computer-implemented method of claim 1, wherein the plurality of values are selected for the record based at least in part on how frequently the plurality of values have occurred in user queries, and wherein the determining, the generating, the prompting, and the storing are performed for each value of the plurality of values.

5. The computer-implemented method of claim 1, wherein the plurality of values are in a plurality of columns of a record; wherein the particular value is in a particular column that is marked for synonym expansion; the computer-implemented method further comprising newly storing the particular value in the particular column; and wherein the determining, the generating, the prompting, and the storing are performed in response to newly storing the particular value in the particular column.

6. The computer-implemented method of claim 1, further comprising:
based at least in part on a characteristic associated with the particular value, selecting one or more examples, each example of the one or more examples comprising another particular value and another set of resulting values;

wherein generating the prompt comprises including, in the prompt, the one or more examples in the output format.

7. The computer-implemented method of claim 1, wherein generating the prompt comprises including, in the prompt, a request for a score of each resulting value of the set of resulting values, the computer-implemented method further comprising:
   storing, in the updated thesaurus entry for the particular value, a set of scores corresponding to the set of resulting values;
   wherein causing display of the particular value, the one or more resulting values, and the option further comprises causing display of one or more scores corresponding to the one or more resulting values.

8. The computer-implemented method of claim 1, further comprising:
   storing, in the updated thesaurus entry for the particular value, a set of scores corresponding to the set of resulting values;
   based at least in part on the set of scores, generating, for each resulting value of the set of resulting values, a recommendation of whether to approve or reject the resulting value;
   wherein causing display of the particular value, the one or more resulting values, and the option further comprises causing display of one or more recommendations of whether to approve or reject the one or more resulting values.

9. The computer-implemented method of claim 1, further comprising:
   receiving another selection of another option that marks at least one other resulting value of the one or more resulting values as rejected;
   based at least in part on the other selection, modifying the updated thesaurus entry to indicate that the at least one other resulting value is rejected;
   wherein the using the updated thesaurus entry does not use the at least one other resulting value to locate the record.

10. The computer-implemented method of claim 1, further comprising:
    analyzing the set of resulting values to determine one or more other resulting values that are excluded from review based on one or more criteria;
    wherein the causing display of the particular value, the one or more resulting values, and the option does not include an option to approve the one or more other resulting values.

11. A computer-program product comprising one or more non-transitory machine-readable storage media, including stored instructions configured to cause a computing system to perform a set of actions including:
    accessing a record comprising a plurality of values, the plurality of values including a particular value;
    determining whether an updated thesaurus entry exists for the particular value;
    based at least in part on determining that the updated thesaurus entry does not exist for the particular value, generating a prompt to discover a set of synonyms and acronyms for the particular value at least in part by substituting a placeholder in a thesaurus prompt template with the particular value, wherein the thesaurus prompt template comprises a request for any synonyms and acronyms for the placeholder, and wherein the thesaurus prompt template specifies an output format;
    prompting a large language model with the prompt to generate a set of resulting values in the output format;
    storing, as at least part of the updated thesaurus entry for the particular value, the set of resulting values, a current date, and an indication that one or more resulting values of the set of resulting values have not been approved;
    causing display of the particular value, the one or more resulting values, and an option to mark any of the one or more resulting values as approved;
    receiving a selection of the option that marks at least one resulting value of the one or more resulting values as approved;
    based at least in part on the selection, modifying the updated thesaurus entry to indicate that the at least one resulting value is approved;
    using the updated thesaurus entry to locate the record in response to a query comprising the at least one resulting value, wherein the record as stored did not include the at least one resulting value as part of the record.

12. The computer-program product of claim 11, wherein the plurality of values are in a plurality of columns of a record; wherein the particular value is in a particular column that is marked for synonym expansion; wherein the set of actions further includes newly storing the particular value in the particular column; and wherein the determining, the generating, the prompting, and the storing are performed in response to newly storing the particular value in the particular column.

13. The computer-program product of claim 11, wherein the set of actions further includes:
    based at least in part on a characteristic associated with the particular value, selecting one or more examples, each example of the one or more examples comprising another particular value and another set of resulting values;
    wherein generating the prompt comprises including, in the prompt, the one or more examples in the output format.

14. The computer-program product of claim 11, wherein the set of actions further includes:
    storing, in the updated thesaurus entry for the particular value, a set of scores corresponding to the set of resulting values;
    based at least in part on the set of scores, generating, for each resulting value of the set of resulting values, a recommendation of whether to approve or reject the resulting value;
    wherein causing display of the particular value, the one or more resulting values, and the option further comprises causing display of one or more recommendations of whether to approve or reject the one or more resulting values.

15. The computer-program product of claim 11, wherein the set of actions further includes:
    analyzing the set of resulting values to determine one or more other resulting values that are excluded from review based on one or more criteria;
    wherein the causing display of the particular value, the one or more resulting values, and the option does not include an option to approve the one or more other resulting values.

16. A system comprising:
    one or more processors;
    one or more non-transitory computer-readable media storing instructions, which, when executed by the system, cause the system to perform a set of actions including:

accessing a record comprising a plurality of values, the plurality of values including a particular value;

determining whether an updated thesaurus entry exists for the particular value;

based at least in part on determining that the updated thesaurus entry does not exist for the particular value, generating a prompt to discover a set of synonyms and acronyms for the particular value at least in part by substituting a placeholder in a thesaurus prompt template with the particular value, wherein the thesaurus prompt template comprises a request for any synonyms and acronyms for the placeholder, and wherein the thesaurus prompt template specifies an output format;

prompting a large language model with the prompt to generate a set of resulting values in the output format;

storing, as at least part of the updated thesaurus entry for the particular value, the set of resulting values, a current date, and an indication that one or more resulting values of the set of resulting values have not been approved;

causing display of the particular value, the one or more resulting values, and an option to mark any of the one or more resulting values as approved;

receiving a selection of the option that marks at least one resulting value of the one or more resulting values as approved;

based at least in part on the selection, modifying the updated thesaurus entry to indicate that the at least one resulting value is approved;

using the updated thesaurus entry to locate the record in response to a query comprising the at least one resulting value, wherein the record as stored did not include the at least one resulting value as part of the record.

17. The system of claim 16, wherein the plurality of values are in a plurality of columns of a record; wherein the particular value is in a particular column that is marked for synonym expansion; wherein the set of actions further includes newly storing the particular value in the particular column; and wherein the determining, the generating, the prompting, and the storing are performed in response to newly storing the particular value in the particular column.

18. The system of claim 16, wherein the set of actions further includes:

based at least in part on a characteristic associated with the particular value, selecting one or more examples, each example of the one or more examples comprising another particular value and another set of resulting values;

wherein generating the prompt comprises including, in the prompt, the one or more examples in the output format.

19. The system of claim 16, wherein the set of actions further includes:

storing, in the updated thesaurus entry for the particular value, a set of scores corresponding to the set of resulting values;

based at least in part on the set of scores, generating, for each resulting value of the set of resulting values, a recommendation of whether to approve or reject the resulting value;

wherein causing display of the particular value, the one or more resulting values, and the option further comprises causing display of one or more recommendations of whether to approve or reject the one or more resulting values.

20. The system of claim 16, wherein the set of actions further includes:

analyzing the set of resulting values to determine one or more other resulting values that are excluded from review based on one or more criteria;

wherein the causing display of the particular value, the one or more resulting values, and the option does not include an option to approve the one or more other resulting values.

\* \* \* \* \*

UNITED STATES PATENT AND TRADEMARK OFFICE
CERTIFICATE OF CORRECTION

Page 1 of 1

PATENT NO. : 12,306,860 B1
APPLICATION NO. : 18/761483
DATED : May 20, 2025
INVENTOR(S) : Garg It is certified that error appears in the above-identified patent and that said Letters Patent is hereby corrected as shown below:

In the Specification

In Column 5, Line 10, delete "TERMS." and insert -- TERMS --, therefor.

In Column 21, Line 7, delete "Android™," and insert -- Android®, --, therefor.

In Column 21, Line 7, delete "KaiO®," and insert -- KaiOS®, --, therefor.

In Column 21, Line 18, delete "Snap" and insert -- Snap® --, therefor.

In Column 23, Lines 40-41, delete "Corporation*," and insert -- Corporation®, --, therefor.

Signed and Sealed this
Twelfth Day of August, 2025

Coke Morgan Stewart
*Acting Director of the United States Patent and Trademark Office*